United States Patent [19]

Lackowski

[11] 3,803,387

[45] Apr. 9, 1974

[54] ALIGNMENT ERROR DETECTION SYSTEM

[75] Inventor: Donald H. Lackowski, Rancho Santa Fe, Calif.

[73] Assignee: The United States of America as represented by the Secretary of the Navy, Washington, D.C.

[22] Filed: Sept. 20, 1972

[21] Appl. No.: 290,614

[52] U.S. Cl. ......... 235/61.5 G, 89/41 CE, 89/41 D, 235/61.5 S
[51] Int. Cl. .......................... G06f 15/20, F41g 5/26
[58] Field of Search ...... 235/61.5 G, 61.5 E, 61.5 S, 235/61.5 R; 343/7 ED; 89/41 CE, 41 D; 33/318, 321, 323; 73/178

[56] References Cited
UNITED STATES PATENTS

| | | | |
|---|---|---|---|
| 3,056,290 | 10/1962 | Kishel | 73/178 |
| 2,968,997 | 1/1961 | Newton et al. | 89/41 M |
| 2,989,672 | 6/1961 | Agins | 89/41 CE |
| 3,144,644 | 8/1964 | Getting | 343/7 ED |
| 3,680,355 | 8/1972 | Goldstein et al. | 33/321 |
| 3,231,726 | 1/1966 | Williams | 235/164 |
| 3,269,179 | 8/1966 | Anderson | 73/178 |
| 3,277,449 | 10/1966 | Shooman | 340/172.5 |
| 3,310,876 | 3/1967 | Yamron | 33/268 |
| 3,665,409 | 5/1972 | Miller et al. | 340/172.5 |

OTHER PUBLICATIONS

Carta et al.; Estimation of Orthogonal Transformations in Strap–Down Inertial Systems, IEEE Transact. on Aut. Control, pp. 97–100, Vol. AC–17, No. 1, Feb. 72.

Otten; A Look Into Strap Down Guidance Design I and II, Control Engineering, Oct. 1966, pp. 61–67 and Nov. 1966, pp. 71–77.

Primary Examiner—Felix D. Gruber
Attorney, Agent, or Firm—Richard S. Sciascia; Ervin F. Johnston; William T. Skeer

[57] ABSTRACT

An alignment system comprises the strap-down orthogonal gyro triads on each of the two devices to be aligned. The pulse outputs from the strap-down orthogonal gyro triads are connected to appropriate digital up-down counters to process the pulse outputs. The outputs of the counters are, in turn, connected to a general purpose digital computer. The digital computer solves the algorithm representing an estimate of the orthogonal attitude transformation between the two devices. The output of the digital computer is indicative of the misalignment and may be used to physically align the two devices in attitude.

1 Claim, 2 Drawing Figures

ALIGNMENT ERROR DETECTION SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of electronic instrumentation. More particularly, this invention relates to the field of attitude alignment instrumentation. In still greater particularity, the invention pertains to the alignment in attitude of predetermined axes of two or more objects mounted on a common body in a general state of rotational motion in inertial space. In still greater particularity, the invention pertains to the alignment of a weapons system and an external reference point mounted on a common vehicular support.

DESCRIPTION OF THE PRIOR ART

In the past, precision alignment in attitude has been accomplished, in the main, by optical means. In general, the principle of alignment was to physically move each of the devices to be aligned with respect to an external reference. Thus, in a fire control system, an optical arrangement was mounted on the directing sensor and a similar arrangement mounted upon the ordnance mount. Each of these devices was then positioned with respect to an external reference, for example, a star or its fiduciary equivalent. Subsequent to the initial alignment, the mechanical integrity of the system was depended upon to preserve the initial alignment.

This prior art arrangement suffered from disadvantages which are largely caused by the dependence on optical systems. For example, optical systems of sufficient accuracy are extremely delicate. Because of their delicate nature, the alignment had to be performed while the ship was relatively motionless. For example, in most instances it was required that a surface or submarine vessel undergoing fire control alignment be rigidly held in a dry dock. Of course, such alignment procedures are costly and require the expenditure of considerable time by specially trained personnel.

Further, in ordnance systems where the projectile is a considerable portion of the mass of the mount, for example, a surface-to-air missile system, the accuracy of continuing alignment depends upon the mechanical precision of the fitment of the ordnance device to its mount. As may be readily appreciated, the accuracy of these prior art arrangements left much to be desired and a procedure and system which would be relatively self contained and could be used aboard ships and aircraft while underway or in flight to align a fire control sensor and a cooperating ordnance system is greatly desired.

SUMMARY OF THE INVENTION

The invention uses strap-down orthogonal gyro triads attached to each of the devices to be aligned in attitude. The gyro triads have digital outputs which are processed by a general purpose digital computer to provide successive estimates of the relative attitudes of the objects. The output of the computer may then be used to mechanically align two devices or to introduce a guidance signal to account for their misalignment.

STATEMENT OF THE OBJECTS OF INVENTION

It is accordingly an object of this invention to provide an improved attitude alignment system.

A further object of this invention is to provide an alignment system which may be used to align in attitude two or more objects on a ship or aircraft while underway or in flight.

Another object of the present invention is to provide an alignment system which may be implemented by electronic control devices without the necessity of manual alignment.

Another object of the subject invention is to provide an alignment procedure which may be carried out in a very short period of time.

A still further object of the present invention is the provision of an alignment system capable of aligning remote ordnance devices directly with the fire control sensor on a ship or aircraft.

These and other objects of the invention will become more readily apparent from the ensuing specification when taken with the drawings.

DESCRIPTION OF THE PREFERRED EMBODIMENT

Figure 1:
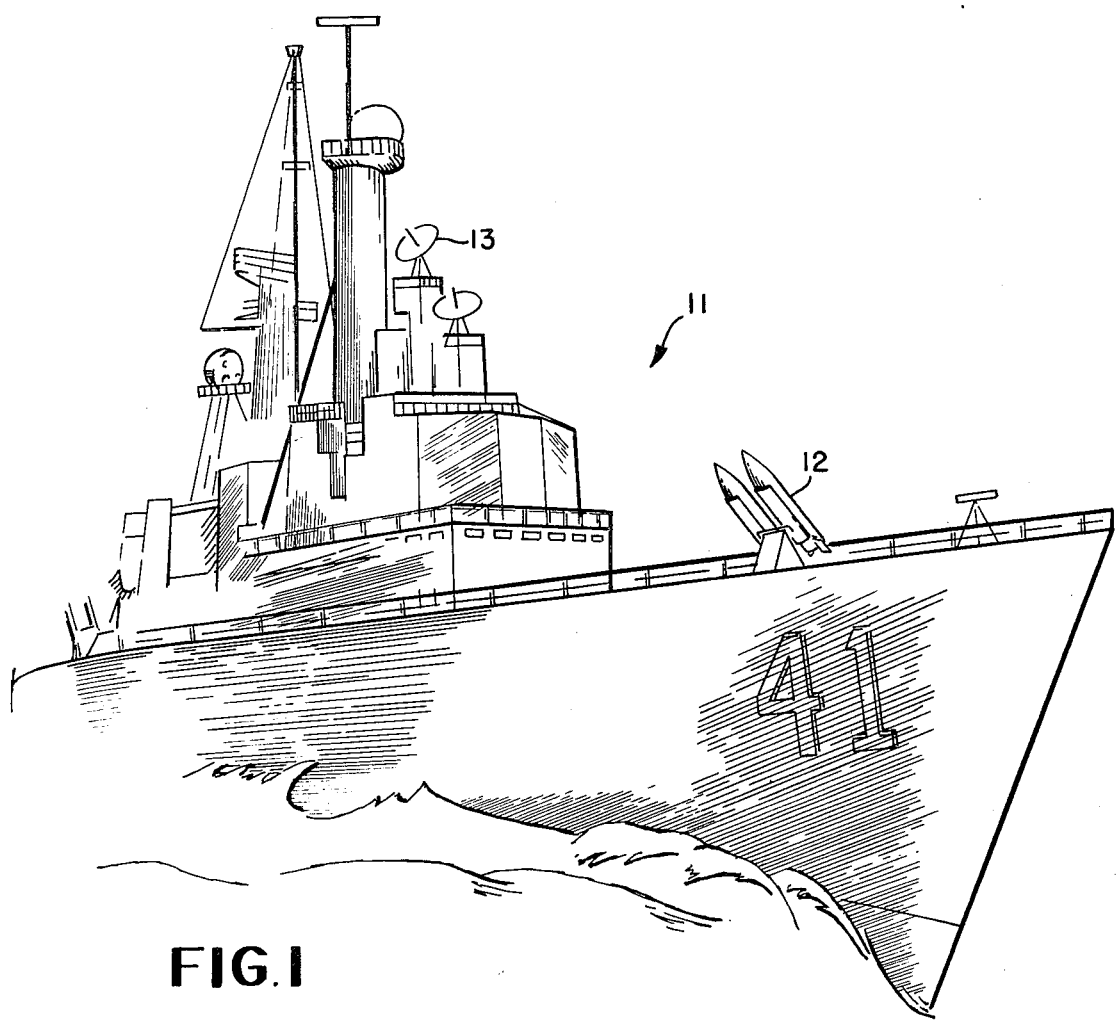
FIG. 1 is a perspective view of a surface vessel employing the system of the invention.

Referring to FIG. 1, a perspective view of a surface ship 11 is shown. An aerial missile launcher 12 is mounted on the foredeck of vessel 11 and is driven in azimuth and elevation by suitable motor drives, not shown. Similarly, the fire control antenna 13 is mounted on the superstructure of vessel 11 and is similarly driven so as to track targets upon which antenna 13 is trained.

Some missiles on missile launcher 12 may contain an inertial guidance system employing a strap-down orthogonal gyro triad, to be more completely described herein. When such a missile is on the laucher 12 and prepared to be fired, its inertial guidance system is coupled to the fire control system of surface vessel 11 for guidance and firing information. In such a missile system, the invention uses the internal guidance system of the missile for alignment purposes with the sensor fire control antenna 13. This technique reduces alignment errors that might be generated if the launcher 12 were used as the guidance reference.

In other systems, such as a conventional gun, the strap-down orthogonal gyro triad may be mounted on the ordnance device.

Although the system of the invention is described as it applies to the surface naval vessel and equipment thereon, it will be obvious to those versed in the instrumentation arts that the system of the invention may be utilized in a wide variety of environments. For example, the system may be employed on an aircraft to align air launched missiles with the fire control system carried on the aircraft. Similarly, the system may find application in a submarine vehicle using motor driven torpedoes or rocket propelled missiles. Since such environmental differences are clearly within the scope and purview of those familiar with the instrumentation and control arts, no further description of such environmental variations are necessary for the full and complete understanding of the invention.

Figure 2:
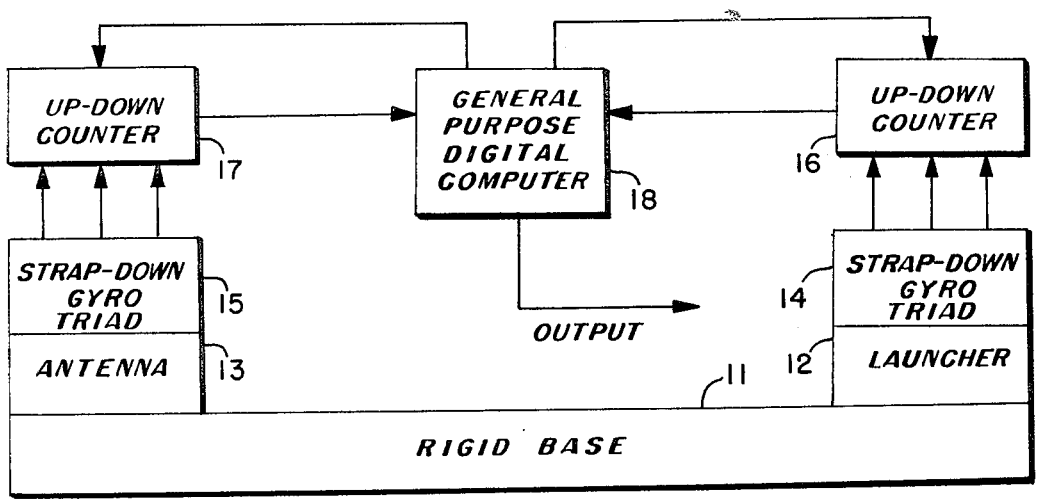
FIG. 2 is a diagrammatic showing of the circuit arrangement interconnecting the component part of the system of the invention.

Refering to FIG. 2, a diagramatic illustration of the component parts of the system of the invention and the manner in which they interface, one with the other, will be described. As shown, vessel 11 is represented as a rigid base upon which antenna 13 and launcher 12 are mounted. A strap-down orthogonal gyro triad 14 is shown attached to launcher 12 and, as explained above, may be the strap-down orthogonal gyro triad employed in the guidance system of the missile to be fired. Triad 14 is, of course, mechanically aligned with the axes of the laucher.

Strap-down gyro triad 14 is comprised of three gyros of the rate-integrating type having a pulsed output. Such gyros may be, for example, of the laser type or of the pulse rebalance type. Gyros of the laser type have shown particular promise in developmental models of the invention. Such gyros are well known in the instrumentation arts and accordingly, need not be described in great detail herein. However, it should be noted that a description of the laser variety of gyro is given by J. Killpatrick in "The Laser Gyro," *IEEE Spectrum*, pp 45–55, October 1967.

Each of the gyros comprising strap-down orthogonal gyro triad 14 is mounted with its axis of sensitivity orthogonally disposed with respect to the axes of sensitivity of the remaining two gyros comprising the triad. In this position each strap-down orthogonal gyro triad is responsive to any angular movement in inertial space.

Similarly, a strap-down orthogonal gyro triad 15 is shown mounted on and mechanically aligned with the axes of antenna 13 and, as in the case of strap-down orthogonal gyro triad 14, is sensitive to the angular motions in inertial space experienced by antenna 13. Of course, continuous pulsed outputs are obtained from both strap-down orthogonal gyro triads 14 and 15 due to the continuous angular motion of the rigid base, vessel 11, caused by the normal action of propulsive forces, waves, and the motion of the earth.

For all practical purposes, vessel 11 may be considered a torsionally rigid mounting. Modern naval architecture had advanced to the point where a high degree of torsional rigidity is obtainable. However, some flexure occurs when launcher 12 and antenna 13 are spaced a considerable distance apart on vessel 11. Some of this flexure is of a relatively high frequency as might be caused by shipboard vibrations. This high frequency component is smoothed by the alogrithm used to program the shipboard computer, to be described. Other components have a low frequency and may be caused by other forces acting on vessel 11 over long time periods such as, for example, the differential solar heating caused by the vessel 11 having one side toward the sun for extended periods. These low frequency components are corrected by the short data sampling periods, as will be explained herein.

Of course, the errors caused by these flexure components are of a very small magnitude and, as noted above, are compensated for to some extent by the nature of the computational handling of the data.

The outputs from strap-down orthogonal gyro triads 14 and 15 are fed to conventional three-channel, up-down digital counters 16 and 17. Counters 16 and 17 respond to the pulse output of strap-down gyro triads 14 and 15 and store the pulse count therefrom over a predetermined sampling period. Each of the counters 16 and 17 is reset after a predetermined sampling interval by a trigger pulse supplied by a general purpose digital computer 18 to which counters 16 and 17 are electrically connected, as indicated by the arrow from digital computer 18 to the counters.

From the foregoing, it will be clear that gyro triads 14 and 15 sense the same angular motion caused by the movement of rigid base 11 in inertial space. Thus, if antenna 13 and laucher 12 are in alignment, the outputs of counters 16 and 17 will be identical. Quite naturally, this condition seldom occurs in assembly and, therefore, must be corrected to obtain optimum operational performance.

It should be noted that, although both launcher 12 and antenna 13 are independently movable, alignment in accordance with the invention requires that each object be held fixed with respect to rigid base 11 during the data collection intervals.

To obtain the estimate of angular misalignment, computer 18 compares the different responses of gyro triads 14 and 15 to their common motion and computes an estimation of the attitude transformation in the form of a 3 × 3 matrix transformation. As will be apparent to those versed in the computation arts, such a form is a conventional mathmatical expression.

General purpose digital computer 18 may be of any desired type which is capable of being programmed to accept the pulse data from counters 16 and 17 for the solving of the computational problems of attitude alignment transformations. A variety of programming alogrithms are available which will provide an estimate of the attitude transformation between antenna 13 and and launcher 12. For a more complete treatment of the mathematical aspects of the problem, the inventor's co-authored article entitled "Estimation of Orthogonal Transformations in Strapdown Inertial Systems," appearing in the February 1972 issue of the *IEEE Transactions on Automatic Control*, Volume AC-17, No. 1-on pages 97–100 is referenced. It is sufficient for the present invention to note that general purpose computer 18 may be programmed by the alogrithm.

$$A = \left[ \sum_{k=1}^{N} X_k Y_k T \right] \left[ \sum_{k=1}^{N} Y_k X_k T \right] \left[ \sum_{k=1}^{N} X_k Y_k T \right]^{-\frac{1}{2}}$$

Where;
  $A$ is the estimated orthogonal attitude transformation between launcher 12 and antenna 13
  $N$ = *total number of pairs of observations from counters 16 and 17*
  $X_k$ = three dimensional vector representing Kth observation from counter 16
  $Y_k$ = three dimensional vector representing Kth observation from counter 17
  $T$ = *matrix transpose operation*

As will be apparent to those faimiliar with the instrumentation arts, a variety of digital computers and associated programming techniques are available which may be used for digital computer 18 in the practice of the invention. For example, the AN/UYK-7 series of computers as well as the AN/USQ-20 series, both commonly used on shipboard, have proven satisfactory when programmed to solve the above algorithm. Further, the UNIVAC 1218/1219 series of computers has also proven to be compatible with the system of the invention. Choice as between these various units will depend upon the other purposes for which they are employed aboard the particular vehicular support.

If desired, the output of digital computer 18 may be used to align drive launcher 12 by moving it with its internal motor drive arrangement into alignment with antenna 13. Thereafter conventional synchronous motor control arrangements preserve the alignment. Of course, as previously described the output of digital computer 18 may also be fed to the missile's guidance system to provide an electrical alignment. That is, an error signal is fed to the digital computer in the guidance system of the missile to account for the difference of initial misalignment between antenna 13 and launcher 12. Upon launch, the missile uses the error signal as a component part of its guidance control to guide it to the target. However, normally alignment is effected by mechanical manipulation.

Mode of Operation

The mode of operation of Applicant's invention is essentially the mode of operation of the individual components. That is, each of the components to be aligned has a conventional and strap-down orthogonal gyro triad arrangement mounted thereon and mechanically aligned with its axes. As previously described, each strap-down gyro triad comprises three strap-down gyro units of the type described mounted together to form a unitary assembly. Each individual strap-down gyro unit has its axis of sensitivity at right angles to the axis of the other two units. In this configuration the triad is sensitive to inertial angular changes in any direction.

The output pulses of the strap-down orthogonal gyro triads are counted by conventional digital up-down counters and the count rates are, as previously noted, determined by the angular motion in inertial space of the devices to be aligned during the sampling period. General purpose digital computer 18, to which the outputs of the counters are fed, determines a sampling period and rate and provides reset pulses to the counters. Digital computer 18 is programmed by a suitable alogrithm, as discussed above, to compute an alignment error signal in the form of a 3 × 3 matrix transformation. The output of digital computer 18, indicated as an arrow in FIG. 2, is then used to provide an error signal which is used in a conventional fashion to produce the desired alignment, either electrical or mechanical. Naturally, the output will be of the form to effect the desired alignment procedure. Thus, for mechanical alignment a printout may be satisfactory.

The foregoing description taken together with the appended claims constitutes a disclosure such as to enable persions skilled in the instrumentation and the electronics arts and having the benefit of the teachings contained herein to make and use the invention. Further, the structure herein described meets the object of invention, and generally constitutes a meritorious advance in the art unobvious to such a skilled worker, not having the benefit of these teachings.

Obviously, many modifications and variations of the present invention are possible in the light of the above teachings, and, it is therefore understood that, within the scope of the disclosed inventive concept, the invention may be practiced otherwise than specifically described.

What is claimed is:
1. An alignment error detection system comprising:

a surface vessel;
a first movable object mounted on said surface vessel to share angular movements thereof in inertial space and for controlled movements including a fixed position with respect thereto;
a first strap-down orthogonal laser-gyro triad sensor attached to and mechanically aligned with said first object for sensing angular movements thereof in inertial space;
a second movable object mounted on said surface vessel rigid base and spaced apart from said first movable object to share angular movements of said rigid base and capable of independent controlled movement including a fixed position with respect thereto;
a second strap-down orthogonal laser-gyro triad sensor attached to and mechanically aligned with said second movable object for sensing angular movements thereof in inertial space;
digital computer means for computing an attitude transformation indicative of the misalignment of said first and second movable objects when said first and second movable objects are in their fixed positions and according to the algorithm, $$A = \left[ \sum_{k=1}^{N} X_k Y_k T \right] \left[ \sum_{k=1}^{N} Y_k X_k T \right] \left[ \sum_{k=1}^{N} X_k Y_k T \right]^{-\frac{1}{2}}$$

Where:
A is the estimated orthogonal attitude transformation, or error signal between the first and second movable object;
N is the total number of pairs of observations from the first and second strap-down orthogonal gyro triad sensors when the first and second movable objects are in their fixed positions;
$X_k$ is the three dimensional vector representing the Kth observation from said first strap-down orthogonal gyro triad sensor;
$Y_k$ is the three dimensional vector representing the Kth observation from said second strap-down orthogonal gyro triad sensor;
T is the matrix transpose operation;
A first up-down, three-channel counter connected to said
first strap-down orthogonal gyro triad and connected to said digital computer means to feed the output the first gyro triad thereto and connected to said digital computer to be periodically reset thereby; and
a second up-down, three-channel counter connected to said second strap-down orthogonal gyro triad and connected to said digital computer means to feed the output of the second gyro triad thereto and connected to said digital computer to be periodically reset thereby.

* * * * *